United States Patent
Iwamura et al.

(10) Patent No.: US 8,583,191 B2
(45) Date of Patent: Nov. 12, 2013

(54) BASE STATION APPARATUS AND METHOD USED FOR MOBILE COMMUNICATION SYSTEM

(75) Inventors: Mikio Iwamura, Yokohama (JP); Atsushi Harada, Kawasaki (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 381 days.

(21) Appl. No.: 12/524,731

(22) PCT Filed: Jan. 31, 2008

(86) PCT No.: PCT/JP2008/051503
§ 371 (c)(1),
(2), (4) Date: Jul. 28, 2009

(87) PCT Pub. No.: WO2008/096660
PCT Pub. Date: Aug. 14, 2008

(65) Prior Publication Data
US 2010/0034127 A1    Feb. 11, 2010

(30) Foreign Application Priority Data
Feb. 9, 2007    (JP) .................................. 2007-031333

(51) Int. Cl.
*H04M 1/00*    (2006.01)
*H04B 1/38*    (2006.01)

(52) U.S. Cl.
USPC .......................................... 455/574; 370/311

(58) Field of Classification Search
USPC .......... 455/561, 574, 571, 522; 370/310, 311, 370/318
See application file for complete search history.

(56) References Cited

U.S. PATENT DOCUMENTS

| | | | | |
|---|---|---|---|---|
| 2007/0097861 | A1* | 5/2007 | Wilde et al. | 370/229 |
| 2007/0184836 | A1* | 8/2007 | He | 455/434 |
| 2008/0101268 | A1* | 5/2008 | Sammour et al. | 370/311 |
| 2008/0102896 | A1* | 5/2008 | Wang et al. | 455/560 |
| 2008/0186893 | A1* | 8/2008 | Kolding et al. | 370/311 |
| 2009/0264133 | A1* | 10/2009 | Lee et al. | 455/436 |
| 2010/0255835 | A1* | 10/2010 | Suzuki et al. | 455/425 |

FOREIGN PATENT DOCUMENTS

JP    2005-260906 A    9/2005

OTHER PUBLICATIONS

International Search Report w/translation from PCT/JP2008/051503 dated May 13, 2008 (3 pages).
Written Opinion from PCT/JP2008/051503 dated May 13, 2008 (4 pages).
3GPP TSG RAN WG2 #56bis; R2-070279; "View on DRX/DTX Control in LTE"; NTT DoCoMo, Inc; Jan. 15-19, 2007, Sorrento, Italy (3 pages).
3GPP TSG RAN WG2 meeting 55bis; R2-070273; "Requirements on DRX/DTX Control in LTE"; NTT DoCoMo, Inc.; Jan. 15-19, 2007, Sorrento, Italy (3 pages).

(Continued)

*Primary Examiner* — Ajit Patel
(74) *Attorney, Agent, or Firm* — Osha Liang LLP

(57) ABSTRACT

A base station apparatus includes a unit configured to determine a discontinuous reception pattern for a user apparatus that is classified according to a channel state of a radio link; and a unit configured to report the discontinuous reception pattern to the user apparatus. The discontinuous reception pattern specifies at least a cycle of discontinuous reception.

12 Claims, 4 Drawing Sheets

(56) References Cited

OTHER PUBLICATIONS

3GPP TS 36.300 V0.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN)"; Feb. 2007 (72 pages).
3GPP TSG RAN WG2 Meeting #57; R2-070463; "DRX in E-TRAN"; St. Louis, Missouri, Feb. 12-16, 2007 (8 pages).
Chinese Office Action for Application No. 200880004260.9, mailed on May 31, 2012 (12 pages).
LG Electronics, "DRX Scheme" 3GPP TSG-RAN WG2 #56bis, R2-070265, Jan. 15-19, 2007, Sorrento, Italy.
Samsung, "DRX Operations for Connected Mode UEs in LTE" 3GPP TSG-RAN2 Meeting #56, R2-063120, Nov. 6-10, 2006, Riga, Latvia.
Ericsson, "DRX and DTX in LTE_Active" TSG-RAN WG2 Meeting #52, R2-060967, Mar. 27-31, 2006, Athens, Greece.
NTT Docomo, Inc., "Views on DRX/DTX Control in LTE" 3GPP TSG RAN WG2 #56bis, R2-070279, Jan. 15-19, 2007, Sorrento, Italy.

* cited by examiner

BASE STATION APPARATUS AND METHOD USED FOR MOBILE COMMUNICATION SYSTEM

TECHNICAL FIELD

The present invention relates to a technical field of mobile communications. More particularly, the present invention relates to a base station apparatus and a method used in a mobile communication system.

BACKGROUND ART

In this type of technical field, 3GPP that is a standardization group of W-CDMA studies a communication scheme that becomes a successor to the wideband code division multiple access (W-CDMA) scheme, the high speed downlink packet access (HSDPA) scheme, the high speed uplink packet access (HSUPA) scheme and the like, that is, 3GPP studies Long Term Evolution (LTE).

In the LTE, an inactive (idle state) user apparatus can move between cells while performing discontinuous reception (DRX) of a paging channel, and the user apparatus is managed for each of tracking areas (TA) including one or more cells while maintaining the location registration state to be the newest state. In the idle state, there is no context of the user apparatus in the base station. The location registration state is managed by an upper station. When the network calls a user apparatus which is in an idle state, the paging channel is transmitted all together in all cells belonging to the tracking area in synchronization with DRX timing of the user apparatus, so that an incoming call arrives at the user apparatus.

By the way, in the LTE, mainly from the viewpoint of battery saving, even an active user apparatus performs discontinuous reception as necessary. For example, in a service in which internet access is performed, since traffic arrives like bursts, there is a case in which a considerable length of time elapses between data transmission and next data transmission. For example, a user downloads a web page and reads the page, then, after a time elapses, the user downloads a next page. In this case, discontinuous reception is performed.

In a connected state, there is the context of the user apparatus in the base station, so that the network ascertains the position of the user apparatus in units of cells. In order to decrease processing for generation/deletion of context and to decrease signaling for establishing lines in the base station, it is effective to apply discontinuous reception in a connected state without changing the state of the user apparatus to the idle state. In addition, burst packets can be transmitted with less delay while avoiding battery consumption.

The user apparatus performing discontinuous reception operates while switching between an awake state and a sleep state in a predetermined cycle (DRX cycle), and the user apparatus receives a L1/L2 control signal in the cycle. The user apparatus demodulates the L1/L2 control signal so as to check presence or absence of information destined to the user apparatus. The information may include information indicating that there is downlink data, resource blocks and a data format (data modulation scheme and the like) used when there is the downlink data, and resource blocks and a data format that can be used for next uplink data transmission, and the like. If there is information destined for the user apparatus, the user apparatus receives downlink data according to the information, for example. If not, the state of the user apparatus changes from the awake state to the sleep state, so that the user apparatus waits until next wake-up timing.

Generally, the longer the DRX cycle is, the larger the effects of battery saving or power savings become. But, it should be noted that DRX also affects QoS. For example, the non-patent document 1 discloses a technique for setting DRX cycle for each radio bearer.

[Non-patent document 1] 3GPP contribution document, R2-070463, Feb. 6, 2007

DISCLOSURE OF THE INVENTION

Problem to be Solved by the Invention

By the way, since positions and communication environments of user apparatuses in a service area vary, even though radio bearers are the same, channel states or radio propagation states of each user apparatus are not the same. A user apparatus in which the channel state is not good may fail in reception of a downlink L1/L2 control signal or the succeeding data signal. In the case when the discontinuous reception is being performed, if the user apparatus fails to receive a downlink signal, disconnected state continues until the timing of next awaking, so that transmission delay of the downlink signal may become linger.

Even when data reception fails, if reception of L1/L2 control signal succeeds, retransmission control can be started early as much as possible by returning a negative response (NACK) to the base station. However, if reception of the L1/L2 control signal fails, the user apparatus cannot even return the negative response (NACK), so that propagation delay may become very long. There is a fear that the longer the DRX cycle is, the more serious this tendency becomes.

Especially, a user apparatus located at a cell edge is prone to fail in reception of the downlink signal compared with a user apparatus located near the base station. When the user apparatus at the cell edge sends and receives information on handover control, it is not desirable especially that the propagation delay becomes long.

An object of the present invention is to reduce delay that occurs, after a user apparatus performing discontinuous reception fails in reception of a L1/L2 control signal, until the user apparatus properly receives the L1/L2 control signal next.

Means for Solving the Problem

A base station apparatus used in the present invention includes a unit configured to determine a discontinuous reception pattern for a user apparatus that is classified according to a channel state of a radio link; and a unit configured to report the discontinuous reception pattern to the user apparatus. The discontinuous reception pattern specifies at least a cycle of discontinuous reception.

Effect of the Invention

According to the present invention, it becomes possible to reduce delay that occurs, after a user apparatus performing discontinuous reception fails in reception of the L1/L2 control signal, until the user apparatus properly receives the L1/L2 control signal next.

DESCRIPTION OF REFERENCE SIGNS 11 radio reception unit (RxRF)
12 DRX pattern selection information processing unit
13 notification signal generation unit
14 radio transmission unit (TxRF)

PREFERRED EMBODIMENTS FOR CARRYING OUT THE INVENTION

According to an embodiment of the present invention, a DRX pattern is properly set for each user apparatus according to a channel state. The DRX pattern is determined such that an awake period per a unit time becomes longer for a user apparatus, for which the channel state is not good, that is located at a cell edge. Accordingly, the user apparatus for which the channel state is not good awakes longer in DRX, so that the delay after failure of reception of the downlink signal does not become long.

For convenience of explanation, while specific numerical value examples are used, such numerical values are merely examples, so that any appropriate value may be used as necessary unless specified otherwise.

Embodiment 1

Figure 1:
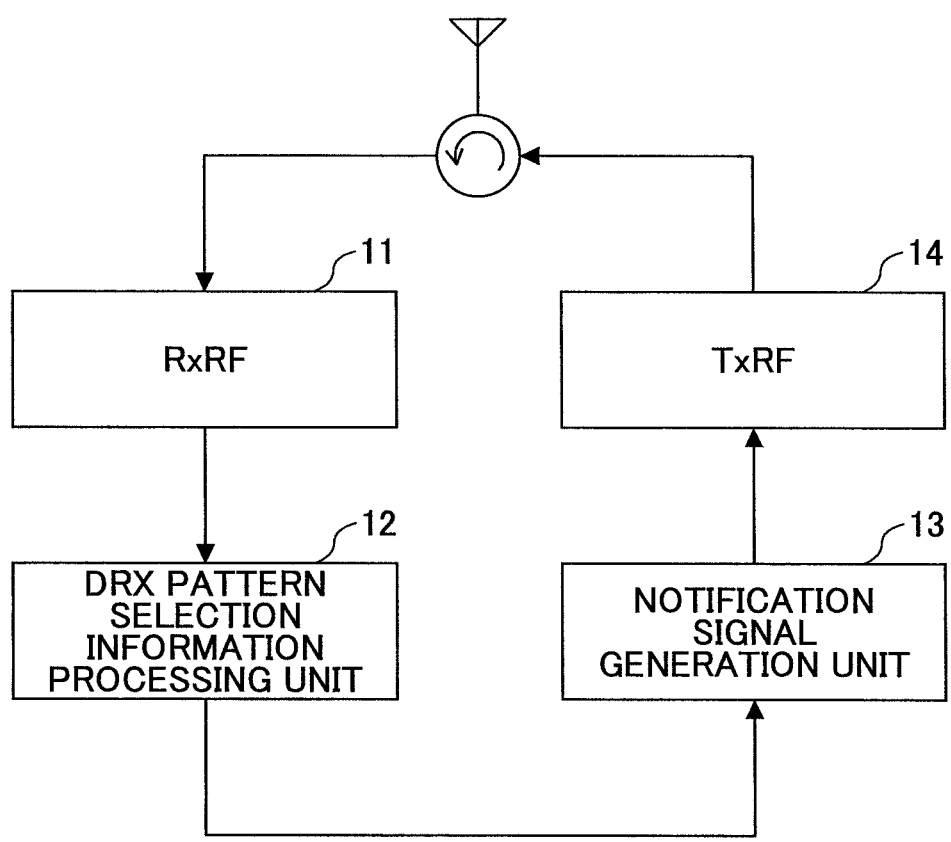
FIG. 1 is a functional block diagram of a base station that is used in an embodiment of the present invention.

FIG. 1 shows functional blocks of a base station that is used in an embodiment of the present invention. FIG. 1 shows a radio reception unit (RxRF) 11, a DRX pattern selection information processing unit 12, a notification signal generation unit 13 and a radio transmission unit (TxRF) 14.

The radio reception unit (RxRF) 11 performs power amplification processing, frequency conversion processing, band limitation processing, analog digital conversion processing, decoding and demodulation processing and the like on a radio signal received from the user apparatus via an antenna and a duplexer. The radio reception signal includes information indicating downlink reception quality (channel quality indicator CQI derived from received level of the downlink reference signal, for example), and/or an uplink reference signal.

The DRX pattern selection information processing unit 12 processes CQI or information including (reception quality of) an uplink reference signal reported from the user apparatus, so as to select a DRX pattern suitable for the user apparatus. The DRX pattern is specified by information indicating a cycle of discontinuous reception when the user apparatus performs discontinuous reception, and by information indicating how the awake period and the sleep period occur in a discontinuous reception cycle. Operation of the DRX pattern selection information processing unit 12 is described later.

The notification signal generation unit 13 generates a notification signal for reporting the determined DRX pattern to the user apparatus. The DRX pattern may be reported by any proper method. But, normally, since the DRX pattern is not changed frequently, information indicating the DRX pattern is included in a data signal following the L1/L2 control signal. More particularly, the information indicating the DRX pattern may be reported using a MAC control PDU, or reported using a L3-RRC message.

The radio transmission unit (TxRF) 14 performs processing for transmitting a radio signal to the user apparatus via the duplexer and the antenna. The processing may include digital analog conversion processing, coding and modulation processing, frequency conversion processing, band limitation processing, power amplification processing and the like. The radio signal includes a L1/L2 control signal and a data signal. The L1/L2 control signal may include information indicating which user apparatus is assigned the following data signal, and indicating which resource block is assigned in what transmission format, include information indicating which user apparatus may transmit signals using which resource block and what transmission format in a next uplink data transmission, and include acknowledgement information (ACK/NACK) for past uplink data. The data signal may include a notification signal indicating a DRX pattern in addition to user traffic data to the user apparatus.

Figure 2:
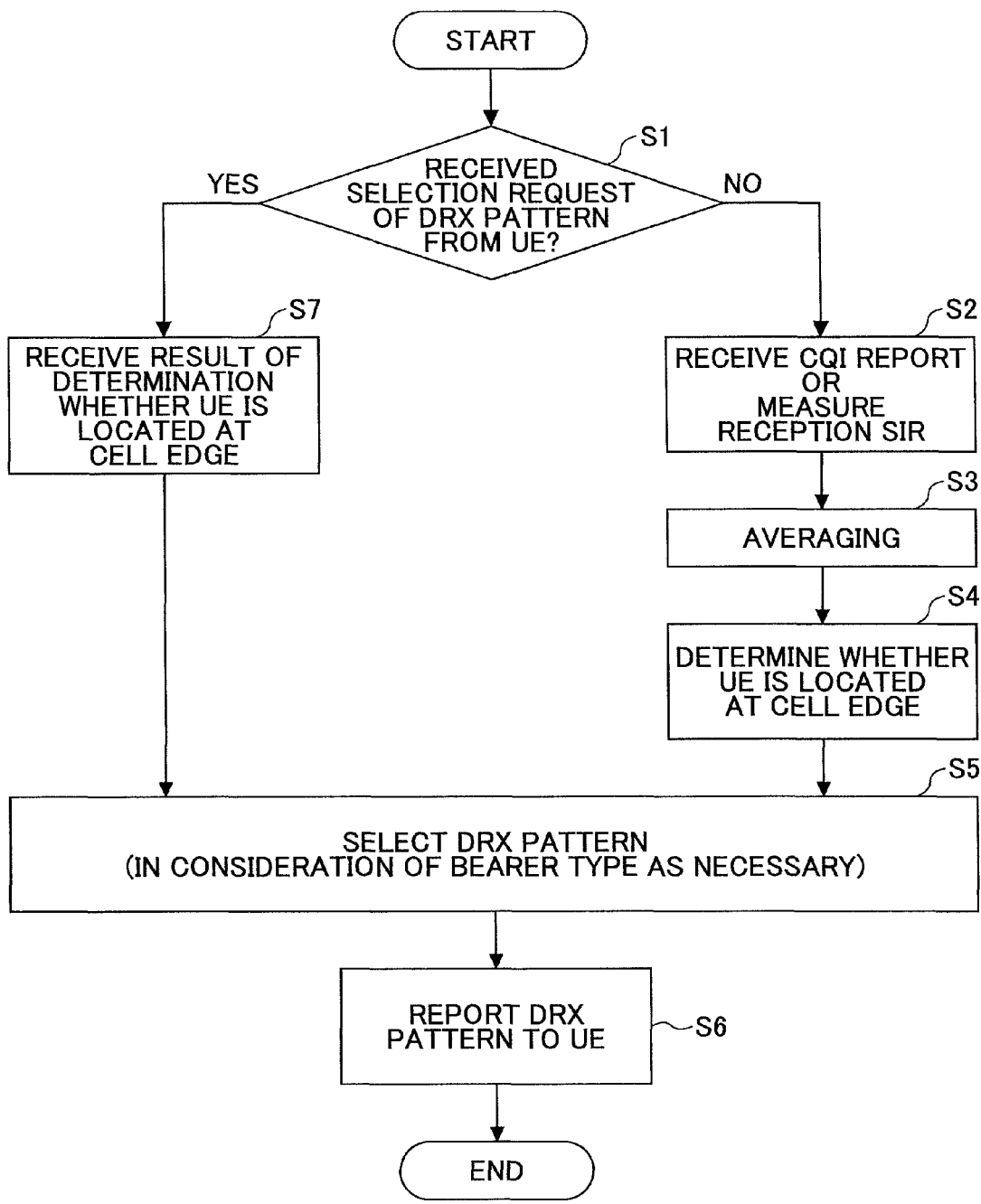
FIG. 2 is a flowchart showing process procedure performed in the DRX pattern selection information processing unit shown in FIG. 1.

FIG. 2 shows a flowchart of process procedure performed by the DRX pattern selection information processing unit 12. In step S1, it is determined whether a DRX pattern selection request is received from a user apparatus. Since the base station performs the selection of the DRX pattern initiatively, the base station determines whether to perform selection in principle. However, the DRX pattern may be selected in response to a request from the user apparatus. Operation in the case when receiving the request is described later.

In step S2, the DRX pattern selection information processing unit 12 receives a channel quality indicator (downlink CQI) indicating downlink channel state from the user apparatus. Alternatively, the DRX pattern selection information processing unit 12 may measure reception quality SIR of an uplink reference signal received from the user apparatus and measure a channel quality indicator (uplink CQI) of the uplink channel state. Good or bad of the channel state is determined based on both or one of the downlink CQI and the uplink CQI. Strictly speaking, the channel state is different between uplink and downlink. But, in the present embodiment, since average quality rather than instantaneous quality is used for later signal processing, CQI prepared in step S2 may be for uplink or for downlink or for both.

In step S3, reported or measured CQI is averaged. Averaging may be realized by passing the CQI through a low-pass filter, for example. Averaged CQI is an amount that gently changes such that it follows shadowing or path loss (propagation loss) and the like but does not follow instantaneous fading and the like.

In step S4, it is determined whether the user apparatus is located at a cell edge based on the averaged CQI. When the averaged CQI is bad, it is determined that the user apparatus is located at a cell edge. When the averaged CQI is good, it is determined that the user apparatus is located near a base station.

In step S5, a DRX pattern to be used by the user apparatus is determined according to whether the user apparatus is located at a position of the cell edge. The DRX pattern is specified by information indicating a cycle of discontinuous reception when the user apparatus performs discontinuous reception, information indicating how an awake period and a sleep period occur in a discontinuous reception cycle and the like.

In step S6, the DRX pattern determined in step S5 is reported to the user apparatus, and the flow ends.

Figure 3:
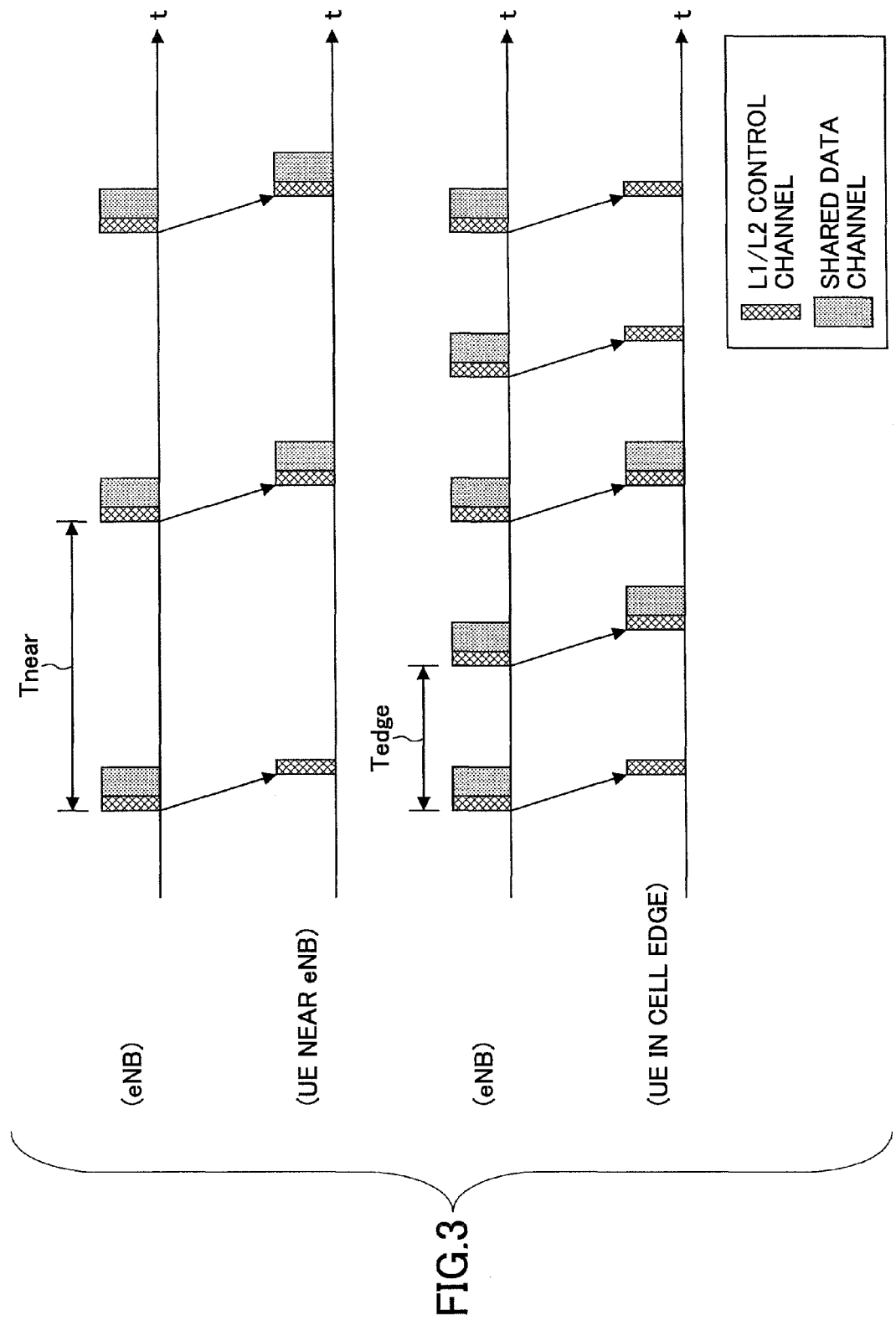
FIG. 3 is a diagram showing a situation in which DRX cycle of a user apparatus at a cell edge is set to be shorter than DRX cycle of a user apparatus that is located near the base station.

FIG. 3 shows an example of the DRX pattern, and shows an example in which DRX cycle $T_{edge}$ (10 ms, for example) of a user apparatus at a cell edge is set to be shorter than DRX cycle $T_{near}$ (20 ms, for example) of a user apparatus that is not located at a cell edge. In either case, the user apparatus awakes according to the discontinuous reception cycle, receives and demodulates the L1/L2 control signal, receives data destined to the user apparatus if there is the data, and returns to a sleep state and waits until next awake timing if there is not the data. By configuring the system such that the user apparatus at the cell edge awakes more frequently, power saving by battery saving can be achieved for a user apparatus near the base station while decreasing delay after failure of reception of a downlink signal until proper next reception of the downlink signal.

Figure 4:
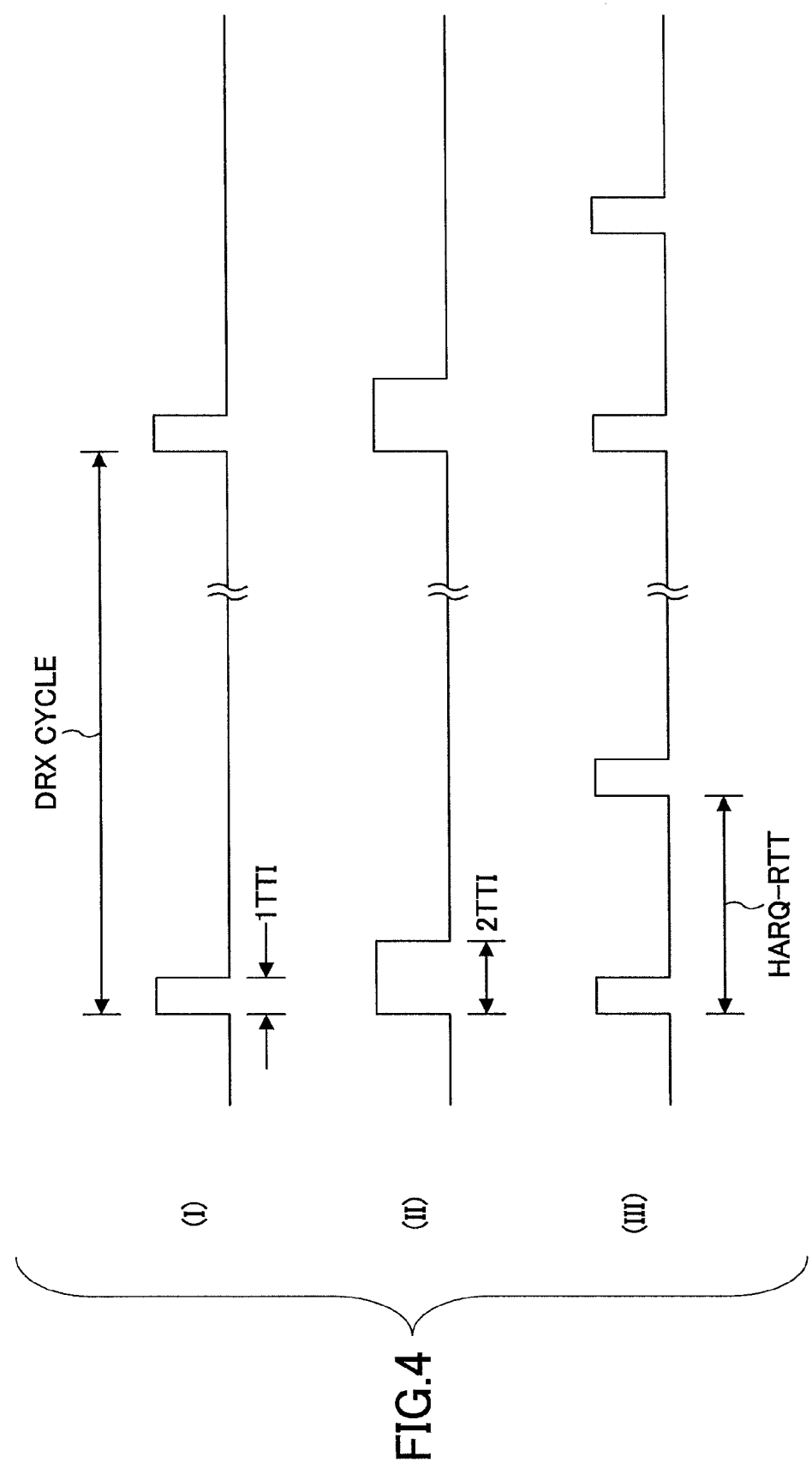
FIG. 4 is a diagram showing a DRX pattern example.

FIG. 4 shows an example in which a ratio (duty ratio) of the awake period in a DRX cycle can be changed aside from whether DRX periods are the same or not. The DRX pattern may be determined by adjusting each of the length of the DRX cycle and the size of the duty ratio.

In (I), the user apparatus awakes only for a period of 1 TTI (1 subframe) every DRX cycle, and is in a sleep state other than the awake period.

Also in (II), the user apparatus awakes in the same DRX cycle, but, (II) is different from (I) in that the user apparatus awakes for 2 TTIs (2 subframes) continuously. The duty ratio may be set such that the ratio of the awake period for a user apparatus at a cell edge is greater than that of a user apparatus that is not located at a cell edge. The longer the awake period is, the more the chance of downlink signal transmission increases. Thus, the chance or probability in which a downlink signal is transmitted to the cell edge user increases. Therefore, it becomes possible to decrease delay occurring after failure of reception of downlink signal until next proper reception of the downlink signal. As shown in the figure, it is suitable for data communication which occurs in a burst manner to continuously increase the awake period.

In (III), the user apparatus awakes for a period of 2 TTIs in a cycle. But, (III) is different from (II) in that the user apparatus awakes for 1 TTI after an elapse of a predetermined period after awaking for 1 TTI instead of awaking continuously like (II). The predetermined period is set to be in accordance with a round trip time (RTT) in automatic retransmission control (HARQ: Hybrid Automatic Repeat reQuest).

When the base station detects failure of reception of a downlink signal by the user apparatus in the first awake period, the base station can transmit a retransmission packet to the user apparatus after elapse of a RTT period that is shorter than the DRX cycle. Failure of reception of the downlink signal by the user apparatus can be checked by detecting that ACK/NACK of HARQ is not transmitted (perform DTX detection), for example. Then, if all goes well, the user apparatus can receive the retransmission packet when it awakes secondly in the DRX cycle. By setting the sleep period to be in accordance with the HARQ-RTT, retransmission from the base station to the user apparatus can be started early. Also, a pattern combining (II) and (II) may be set.

In step S5 in FIG. 2, various DRX patterns are determined according to the channel state of the user apparatus as mentioned above. Further, the DRX pattern may be determined according to various radio bearer types such as VoIP communication, control message communication (communication of signaling radio bearer (SRB), for example), HTTP data communication, and e-mail communication. For example, DRX cycle may be determined to be 20 ms for voice packets such as VoIP, and may be determined to be 1 s for HTTP data communication. In addition, the length of DRX cycle and/or ratio of awake period per one cycle may be derived from the viewpoint of types of radio bearers. In addition, the length of DRX cycle and/or ratio of awake period per one cycle may be derived from the viewpoint of channel states.

As mentioned above, it is a principle that the base station determines selection of the DRX pattern as necessary. But, the DRX pattern may be selected according to a request from the user apparatus. When the request is received from the user apparatus, the flow goes to step S7.

When the process goes to step S7, the user apparatus measures downlink reception signal quality, averages the downlink reception signal quality, determines whether the user apparatus is located at a cell edge, and reports determination result to the base station. The base station determines a DRX pattern for the user apparatus according to the determination result (step S5). After that, in step S6, the selected DRX pattern is reported to the user apparatus, and the flow ends. That is, processes corresponding to steps S2, S3 and S4 are performed in the user apparatus, and steps after step S5 are performed in the base station.

For the sake of convenience for explanation, determination between two alternatives is performed determining whether the user apparatus is located at a cell edge or not in step S4. But, determination may be performed from among more than two classifications. In this case, the number of the types of DRX patterns prepared according to channel states can be greater than two.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-31333, filed in the JPO on Feb. 2, 2007 and the entire contents of the Japanese patent application No. 2007-31333 is incorporated herein by reference.

The invention claimed is:

1. A base station apparatus comprising:
   a unit configured to determine a discontinuous reception pattern for a user apparatus that is classified according to a channel quality indicator (CQI) of a radio link; and
   a unit configured to report the discontinuous reception pattern to the user apparatus,
   wherein the discontinuous reception pattern specifies at least a cycle of discontinuous reception.

2. The base station apparatus as claimed in claim 1, wherein a shorter period is set for discontinuous reception for a user apparatus in which a channel state is bad.

3. The base station apparatus as claimed in claim 1, wherein the discontinuous reception pattern specifies a ratio between the awake period and a sleep period per one cycle.

4. The base station apparatus as claimed in claim 3, wherein the discontinuous reception pattern is determined such that switching between the awake period and the sleep period is performed only once in the cycle.

5. The base station apparatus as claimed in claim 3, wherein the discontinuous reception pattern is determined such that switching between the awake period and the sleep period is performed a plurality of times in the cycle.

6. The base station apparatus as claimed in claim 5, wherein at least one of sleep periods occurring between two awake periods is set in accordance with a round trip time in automatic retransmission control.

7. The base station apparatus as claimed in claim 3, wherein the ratio is set such that the awake period of a user apparatus in which channel state is bad becomes longer than the awake period of a user apparatus in which channel state is good.

8. The base station apparatus as claimed in claim 1, wherein the discontinuous reception pattern is determined according to a channel state and a type of radio bearer of the radio link.

9. The base station apparatus as claimed in claim 1, wherein the discontinuous reception pattern is reported to the user apparatus using a MAC control packet data unit or an RRC message.

10. The base station apparatus as claimed in claim 1, wherein a channel state is represented by a channel quality indicator averaged to an extent so as to follow shadowing or path loss.

11. The base station apparatus as claimed in claim 1, wherein a measurement value of a channel state measured in the user apparatus is reported to the base station apparatus, so that the user apparatus is classified according to the measurement value.

12. A method used in a base station apparatus of a mobile communication system comprising:
   a step of determining a discontinuous reception pattern for a user apparatus that is classified according to a channel quality indicator (CQI) of a radio link; and
   a step of reporting the discontinuous reception pattern to the user apparatus,
   wherein the discontinuous reception pattern specifies at least a cycle of discontinuous reception.

* * * * *